Jan. 16, 1940.     L. W. NERNEY     2,187,245
CONDIMENT SPRINKLER
Filed May 14, 1938
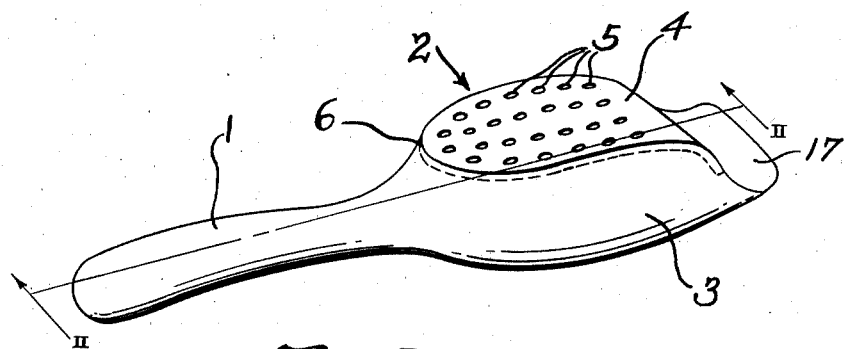
Fig. I
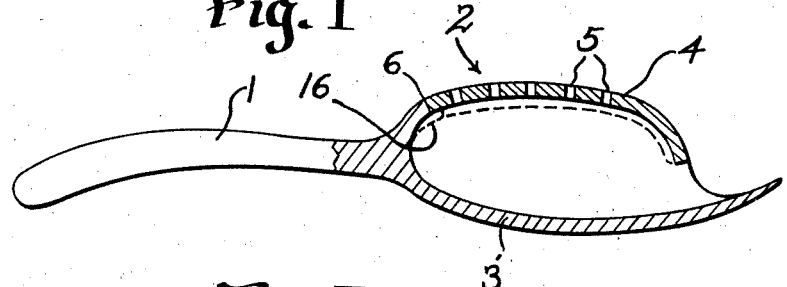
Fig. II
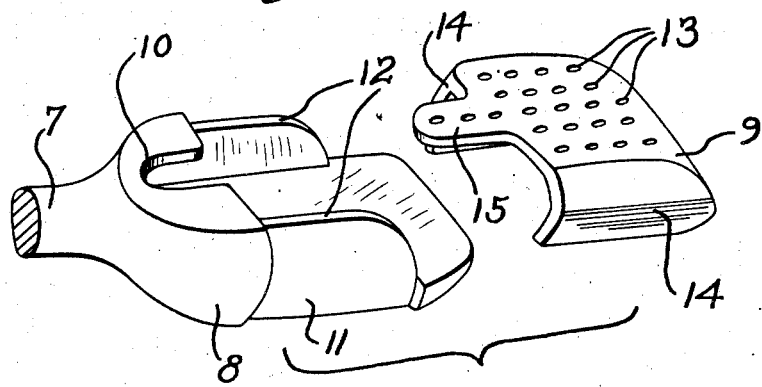
Fig. III
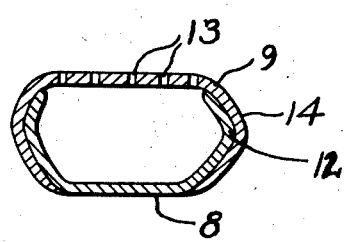
Fig. IV
INVENTOR.
LESTER W. NERNEY
BY Raymond A. Vaquin
ATTORNEY.

Patented Jan. 16, 1940

2,187,245

UNITED STATES PATENT OFFICE 2,187,245

CONDIMENT SPRINKLER

Lester W. Nerney, Attleboro, Mass.

Application May 14, 1938, Serial No. 207,983

5 Claims. (Cl. 65—45)

This invention relates to improvements in improvements in seasoning devices and has particular reference to a seasoning spoon.

One of the principal objects of the invention is to provide a combined scoop and sprinkling type spoon for seasoning.

Another object of the invention is to provide a new and improved scoop and sprinkling type device of composition material or of a combined composition and metal parts.

Another object is to provide a device of the character described with separably interfitted parts formed of the same or different materials.

Other objects and advantages of the invention will become apparent from the following description taken in connection with the accompanying drawings and it will be understood that many changes may be made in the details of construction, arrangement of parts and steps of the methods shown and described without departing from the spirit of the invention as expressed in the accompanying claims. I, therefore, do not wish to be limited to the exact details and methods shown and described as the preferred forms only have been given by way of illustration.

Referring to the drawing:

Fig. I is a perspective view of one form of my invention;

Fig. II is a partial sectional view taken on line II—II of Fig. I;

Fig. III is a perspective view of another form of my invention showing the parts disunited; and Fig. IV is a sectional view taken on line IV—IV of Fig. III with the parts assembled.

Referring more particularly to the drawing wherein similar reference characters designate corresponding parts throughout the several views, the seasoning spoon embodying the invention as shown in Figs. I and II, comprises broadly a handle portion 1 and a combined scoop and sprinkling portion 2.

The parts of the device are preferably made of a plastic composition such as certain urea compounds or of a cellulose compound or of Bakelite, Catalin, Fiberlon, Lucite or the like, these names being the names by which certain plastic compositions are known commercially on the market.

The form of my invention shown in Figs. I and II is preferably made by injection or pressure molding of a material such as those stated above. The material from which the device is molded may be either in sheet, powder or other form depending on the process and apparatus to be employed.

A spoon of this type of material has the advantages that it is light and economical of manufacture and resists corrosion where it is used with salt, etc.

Referring further to the embodiment shown in Figs. I and II. The material may be placed in suitable dies or casting molds having a portion shaped to form the handle 1 and a portion shaped to simultaneously form the bowl shaped portion 3. The bowl shaped portion is provided with an edge 6 shaped to receive the peripheral edge of the top or sprinkler portion 4. The said meeting edges, if the parts are both formed of the same plastic material, are joined by a suitable solvent or adhesive. The handle portion 1 is formed so that it may be held or gripped in the hand or by the fingers while using the spoon, and the scoop portion 3 is preferably formed integral with the member 1 by molding as stated above. The sprinkling portion 4, having openings 5 therein may also be formed integral if it is so desired, but I prefer to form the said portion 4 separate and of a plastic material such as used in making the other portions, although it may be made of metal. This portion 4 may be molded, cut or punched from a sheet of material and then pressed to shape and the openings 5 then punched out or the said portion may be molded to shape and with the openings 5 therein.

The member 4 is then inserted in place and secured therein by cementing or by use of a solvent which will cause the edges to adhere together.

It will be noted that if desired a countersunk shoulder, such as shown dotted at 16, may be formed on the edge 6 of the portion 3 and the edge of the member 4 seated on said shoulder and secured in position thereon.

The end 17 of the portion 3 is relatively straight, as illustrated in Fig. I, and constitutes the scoop portion of the spoon. The bottom of the bowl 3 is spaced from the front edge of the portion 4, as illustrated at 18, to allow the salt, etc. which was scooped up by the spoon to enter the bowl. The spoon is then overturned and the salt, etc. sprinkled by passage through the openings 5.

In the form shown in Figs. III and IV, the handle portion 7 and the scoop portion 8 are preferably formed of a composition material such as the portion 3 stated above, and the sprinkling portion 9, while it may be made of the same material, is preferably made of relatively thin resilient metal.

In this form, the portion 8 is provided with a slot 10 and grooves 11 in the outer faces of its side walls 12.

The sprinkler member 9 is preferably formed of resilient sheet metal, having sprinkler openings 13 formed therein by punching, drilling or the like, bent or otherwise shaped to provide resilient side portions 14 and an integral tongue 15 shaped to extend into the slot 10 with the resilient side walls 14 fitting in the grooved portions 11 of the walls 12. The resiliency of said side portions 14 holds the parts in assembled relation with each other.

In this form it will be noted that, should the sprinkler portion 9 become corroded or clogged, a new member may be readily and quickly inserted in its place.

It will be noted that the plastic materials set forth above are thermoplastic and are particularly adapted for manufacture by molding, pressing and like processes.

It will be noted that the outer adjacent surfaces of the parts 8 and 9 are in flush relation when the said parts are assembled with each other. The parts may be quickly separated for ease in cleansing etc.

From the foregoing it will be seen that I have provided simple, efficient and economical means and processes for obtaining all of the objects and advantages of the invention, particularly the provision of a new and improved seasoning device and a new and improved process of making the same.

Having described my invention, I claim:

1. A seasoning device having a relatively long handle and bowl portion formed integrally of thermoplastic composition, said bowl portion having grooved side walls and a scoop edge portion and a separate distributing portion formed of sheet-like material having a plurality of openings therein and with side portions shaped to fit within the grooved side walls of the bowl portion to hold the said distributing portion on said bowl portion.

2. A seasoning device having a relatively long handle and bowl portion formed of thermoplastic composition, said bowl portion having grooved side walls and a scoop edge portion and a separate distributing portion formed of sheet-like material having a plurality of openings therein and with side portions shaped to fit within the grooved side walls of the bowl portion to hold the said distributing portion on said bowl portion.

3. A seasoning device having a relatively long handle and bowl portion formed of relatively rigid composition, said bowl portion having grooved side walls and a scoop edge portion and a separate distributing portion formed of sheet-like material having a plurality of openings therein and with side portions shaped to fit within the grooved side walls of the bowl portion to hold the said distributing portion on said bowl portion.

4. A seasoning device having a relatively long handle and bowl portion formed of relatively rigid composition, said bowl portion having side walls with an attaching seat and a scoop edge portion and a separate distributing portion formed of sheet-like material having a plurality of openings therein and with side portions shaped to fit said attaching seat of said side walls of the bowl portion to hold the said distributing portion on said bowl portion.

5. A seasoning device having a relatively long handle and bowl portion formed of thermoplastic composition, said bowl portion having side walls with an attaching seat and a scoop edge portion and a separate distributing portion formed of sheet-like material having a plurality of openings therein and with side portions shaped to fit said attaching seat of said side walls of the bowl portion to hold the said distributing portion on said bowl portion.

LESTER W. NERNEY.